Patented Oct. 19, 1937

2,096,181

UNITED STATES PATENT OFFICE 2,096,181

CONDENSATION PRODUCTS

Michael Jahrstorfer and Hans Georg Hummel, Mannheim, Germany, assignors to I. G. Farbenindustrie Aktiengesellschaft, Frankfort-on-the-Main, Germany No Drawing. Application October 24, 1933, Serial No. 695,002. In Germany November 5, 1932

3 Claims. (Cl. 260—3)

The present invention relates to condensation products and means for preparing same.

We have found that valuable condensation products can be obtained by condensing polyamides of polycarboxylic acids containing more than 4 carbon atoms with a formaldehyde substance, while heating until resinification occurs.

The term "formaldehyde substance" is intended to mean formaldehyde and its polymers such as tri- or polyoxymethylene, para- and meta-formaldehyde, and also the N-methylol compounds of said polyamides, and substances yielding formaldehyde, such as hexamethylene-tetramine, acetals and the like.

As suitable initial materials may be mentioned polyamides of open chain and cycloaliphatic, aliphatic-aromatic and aromatic polycarboxylic acids, for example the poly-amides of adipic acid, suberic acid, sebacic acid, phthalic acids, hexahydro-ortho-phthalic acid, phenylene diacetic acid, substituted polybasic carboxylic acids, such as methyl-adipic acid, naphthalic acid, citric acid, diphenic acid, chlorinated phthalic acids, and the amides of the polycarboxylic acids obtainable by adding on hydrocyanic acid to unsaturated fatty acids and subsequent saponification of the nitrile group, and especially the amides of the polybasic acids obtainable by the oxidation of fatty substances, such as hard and soft paraffin wax, mineral and fatty oils, fats, fatty acids, distillation residues from the refining of fatty acids, hydrogenated mono- or polynuclear aromatic hydrocarbons or their derivatives, with the aid of substances containing or supplying oxygen, especially with nitric acid and nitrous gases or of mixtures of the said acids. The initial materials may also consist of polyamides of polycarboxylic acids in which the carbon chain is interrupted by other atoms, as for example amides of polybasic ether carboxylic acids, such as diglycollic acid, or dilactylic acid, polyamides of oxidation products of poly-alkyleneglycols or of polycarboxylic acids containing sulphur, such as thiodiglycollic acid or dithiodiglycollic acid, or polyamides of polycarboxylic acids substituted by nitrogen, such as iminoalpha-alpha'-dipropionic acid and tri-methylamine tri-carboxylic acid (N(CH$_2$COOH)$_3$).

The preparation of the amides of the said carboxylic acids is effected in the usual manner, as for example by the action of gaseous or liquefied ammonia, or of aqueous or ethylalcoholic ammonia solutions on the corresponding carboxylic acid halides and esters or by the direct treatment of the acids with gaseous ammonia at elevated temperature, such as 200° C., if desired at a pressure above atmospheric pressure.

The formaldehyde substance may be employed in the vaporous solid or dissolved form, trioxymethylene, hexamethylene-tetramine, acetals and solutions of formaldehyde, or of a polymer thereof, in water, aqueous solutions or organic solvents being applicable; suitable organic solvents are especially oxygenated, more particularly, hydroxylated organic solvents, as for example esters, such as butyl acetate or ketones and especially alcohols, such as methyl, ethyl, propyl, butyl or amyl alcohols, benzyl alcohol and the mono-phenyl ether of ethylene glycol, which solvents may also be used in the form of aqueous solutions. Examples of oxygenated solvents free from hydroxyl groups are liquid esters, such as butyl acetate and dioxane. It is advantageous to employ from about 1.6 to about 2.5 molecular proportions of formaldehyde for each molecular proportion of polyamide.

The N-methylol compounds corresponding to the amides which are also suitable as initial materials may be obtained in a crystalline form, for example, by the condensation of carboxylic acid amides with aqueous formaldehyde in the presence of alkali.

When working with an aqueous formaldehyde solution, a comparatively viscous, clear liquid is first obtained from which, after removing water, as for example by distilling it off, for example at from 50° to 100° C., in vacuo, a transparent, limpid, soft and pliable resin is obtained which is soluble in water and organic solvents, especially ethyl alcohol and glacial acetic acid.

If the condensation be carried out in the presence of very small amounts of water, or in the complete absence of water, but in the presence of organic liquids, especially compounds containing hydroxyl groups, resinous products are likewise obtained which are soluble in alcohols or esters, insoluble in water and distinguished by their good waterproof and very good film-forming properties and in which presumably ethers are present, provided a hydroxyl-bearing compound has been employed. As organic compounds containing hydroxyl groups may be mentioned, for example, alcohols, such as ethyl alcohol, butanol, benzyl alcohol, ethylene glycol and glycerol, partially etherified or esterified polyhydric alcohols, such as ethylene glycol monoethyl ether, ethylene glycol mono-phenyl ether and ethylene glycol monocresyl ether (obtainable by condensing ethylene oxide with a commercial mixture of the isomeric cresols), ethylene glycol monacetate, mono- and di-glycerides, castor oil and hydroxy-ketones. It is especially advantageous to employ mono- or di-glycerides, i. e. esters of glycerol in which the hydroxyl groups are partially esterified with the acids of fatty fats or oils, such as oleic acid, linoleic acid, China wood oil acids, or ricinoleic acid mono- or di-glycerides, whereby products are first obtained which are highly extensible when in comparatively thin layers and which may be hardened to less extensible films showing a high stability to repeated bending.

The condensation may be carried out in a very simple manner by moderate heating of a mixture of the polyamides of polybasic carboxylic acids with solid formaldehyde in the absence of water to temperatures which lie substantially below the melting point of the acid amides, preferably at between about 120° and about 130° C.; when the condensation is carried out in the presence of a solvent, the temperature employed is the boiling point of the solvent.

It is advantageous, but not absolutely necessary, to add condensing agents when carrying out the reaction; in some cases the initial materials may already contain small amounts of free acid from their preparation and this may act as a condensing agent. Not only acids, such as hydrochloric, sulphuric, phosphoric, benzene sulphonic, formic and acetic acids and acid esters of polybasic acids, but also the other usual substances may be used as condensing agents, for example, salts, such as sodium bisulphate, primary alkali metal phosphates, secondary and tertiary phosphates and alkaline earth metal, magnesium, zinc or lead carbonates, bases, such as ammonia, pyridine, magnesium, calcium, zinc or lead oxides and caustic alkalies, oxidizing agents, such as hydrogen peroxide and benzoyl peroxide. In some cases it is advantageous to carry out the condensation at increased pressure.

Oxamide is not employed as it does not yield resinous products, but is converted into ammonium oxalate during the condensation.

The condensation products are usually pale-coloured to colourless masses which are readily soluble in liquid alcohols, such as methyl, ethyl, propyl or butyl alcohols, cyclohexanol or ethers and esters of polyhydric alcohols still containing free hydroxyl groups, and which have good film-forming properties. Depending on the initial materials employed and on the molecular proportions in the mixture of acid amide and formaldehyde, condensation products having a great variety of properties are obtained. An increased content of formaldehyde, for example, gives rise to soft and particularly extensible products, the same being true when amides of long-chain acids, or mixtures of different amides are employed.

The properties of the condensation products may be further altered in an advantageous manner by adding before, during or after the condensation other organic substances, especially such as are themselves capable of forming resinous products with formaldehyde. Such additions are for example especially urea and its derivatives and amines such as aniline, which may react with the formaldehyde.

The products obtainable according to this invention may also be added to other natural or artificial resins, as for example resins from phenols, aniline or urea and an aldehyde, and the condensation products of polybasic carboxylic acids, or mixtures thereof with monobasic carboxylic acids, with polyhydric alcohols. Small amounts of carboxylic acid amide-formaldehyde resins are sufficient in these cases to reduce the brittleness peculiar to many natural and artificial resins.

By continuing heating, raising the temperature or heating the final condensation products at temperatures lying above their softening point it is possible, if desired with the assistance of hardening accelerators, as for example acids or substances capable of splitting off acids, such as ammonium chloride or benzalchloride and the like, to convert the soluble condensation products into a hard, infusible and insoluble state. This hardening is usually effected at temperatures ranging between about 100° and about 180° C. and which are somewhat higher than the temperatures used for the condensation. Thus, for example, heating is effected at about 100° C. when the condensation has been carried out in boiling ethyl alcohol, at about 120° C. when the condensation has been carried out in boiling water, and at about 160° to about 180° C. when the condensation has been carried out in the absence of a solvent. The products thus obtained have very good mechanical properties and great pliability and elasticity to bending.

If the thermal hardening process be carried out under pressure, such as between 150 and 500 kilograms per square centimeter, as for example in a heatable press at about 150° C., or devices used for injection moulding, elastic and pliable pressed articles are obtained. In the same manner, shaped articles may be prepared with the co-employment of other powders employed for pressure moulding shaped articles and/or paper, wood meal and like fillers.

The condensation products according to this invention are therefore suitable for a great variety of industrial purposes, for example, as additions to lacquers or varnishes, resins, such as shellac, copals, colophony, urea-formaldehyde resins, phenol-formaldehyde resins, or alkyd resins, in the production of artificial materials, such as artificial leather, for the preparation of pressed articles, laminated sheets and foils, as impregnating agents for textile purposes and as binding agents for abrasive materials.

The following examples will further illustrate the nature of this invention but the invention is not restricted to these examples. The parts are by weight.

Example 1

A mixture of polybasic carboxylic acids (melting point 90° C., boiling point 185° and 220° C. at 3 millimetres of mercury, acid value 546) obtained by the oxidation of the fatty acids of train oil with nitric acid, for example as described in the application for Letters Patent Ser. No. 620,536, filed by us on July 1, 1932 now Patent No. 2,054,979, is heated with gaseous ammonia to 200° C., preferably in a closed vessel until water no longer passes over as described in the British Specification No. 17,414 A. D. 1911. The resulting crude amide is crystallized from hot water and has a melting point of 165° C.

50 parts of this amide are heated at 120° to 130° C. with 25 parts of trioxymethylene while stirring vigorously for an hour. Foaming and evolution of formaldehyde take place and a transparent, ropy, honey-yellow resin is formed, which is insoluble in water and soluble in alcohols, such as methyl, ethyl, propyl or butyl alcohols, cyclohexanol or ethers and esters of polyhydric alcohols still containing free hydroxyl groups.

By adding a very small amount (about 1 per thousand by weight of the resin) of hydrochloric acid, gelatinization of the liquid resin takes place with the formation of an infusible and insoluble product resembling soft vulcanized rubber. The same form of the condensation product may be obtained by heating for a short time at from 140° to 160° C.

If an ethyl alcoholic solution of the still fusible resin be evaporated, an elastic, flexible film of high lustre remains.

If the condensation be carried out in the presence of 25 parts of linoleic acid monoglyceride, a highly extensible, elastic product is obtained, which is readily soluble in ethyl alcohol and stable against water. By heating at 130° C., this resin is converted into the insoluble, equally water resistant state.

Example 2

100 parts of adipic acid diamide having a melting point of 221° C. are heated under a reflux condenser with 250 parts of an aqueous 30 per cent formaldehyde solution and 2 parts of concentrated aqueous hydrochloric acid for 2 hours, complete dissolution of the adipic acid diamide thus taking place. After cooling and filtering off any slight solid deposit, the comparatively viscous liquid is freed from water in vacuo at about 60° C. A transparent fusible condensation product remains behind which is soluble in water and ethyl alcohol, but insoluble in diethyl ether and aliphatic and aromatic hydrocarbons.

By heating the condensation product at about 120° C., a conversion takes place with the splitting off of formaldehyde and giving an infusible product which only swells slightly in ethyl alcohol and water.

If the aqueous solution of the resin be heated for some time at 120° C., there remains, after evaporating the water from a layer of the solution, a colourless, flexible film of hard gloss which cannot be scratched with the finger-nail.

Example 3

100 parts of a mixture of acid amides prepared by the treatment of the mixture of polycarboxylic acids, obtained by the oxidation of paraffin wax with oxides of nitrogen, with ammonia at 190° C. to 200° C., preferably in a closed vessel, while adding small amounts, such as about 3 per cent, of silica gel, are heated to boiling for 3 hours with 250 parts of a 30 per cent aqueous formaldehyde solution and 0.5 part of 30 per cent aqueous hydrogen peroxide solution. The water is then removed by heating in vacuo at about 60° C. The remaining very viscous liquid is heated for about 10 minutes at 140° C. and is thus converted with the splitting off of formaldehyde, into a transparent, pale yellow, soft, still sticky resin which is still soluble in ethyl alcohol but insoluble in water. If the resin be heated still further, it is converted at 170° C. into a very elastic resin from which, when in the warm state, threads may be drawn and is hardened at 180° C. into an infusible, insoluble, rubber-like product.

Example 4

100 parts of the mixture of acid amides obtained by the treatment of the mixture of polybasic carboxylic acids, obtained by the oxidation of train oil fatty acids with nitric acid, with ammonia at from 190° to 200° C., are boiled under a reflux condenser for some hours with 50 parts of trioxymethylene, 200 parts of normal butanol and 0.5 part of a 30 per cent aqueous hydrogen peroxide solution. The resulting viscous solution leaves behind after evaporation of the butanol and heating for an hour at 150° C. a very elastic, transparent, flexible resin soluble in butanol.

Example 5

100 parts of the mixture of acid amides employed in the foregoing example are heated for 3 hours with 50 parts of trioxymethylene in 200 parts of ethylene glycol mono-ethyl ether as solvent with an addition of 1 part of concentrated aqueous ammonia. The viscous solution is evaporated in vacuo. The residue is a tough, viscous liquid which is soluble in ethyl alcohol, almost insoluble in water and which is rapidly converted into a solid elastic resin by further heating it to about 120° C. for about ½ hour with an addition of a small amount of acid, say 0.5 per cent of one of the acids referred to above.

Example 6

140 parts of adipic acid diamide are heated under a reflux condenser with 100 parts of trioxymethylene and 200 parts of ethylene glycol monocresyl ether. After cooling, a pale yellow, viscous liquid is obtained, which may be converted by heating for about 1 hour at 150° C. into a transparent, soft resin soluble in butanol.

Example 7

50 parts of adipic acid diamide are heated at 100° C. with 70 parts of an aqueous 30 per cent formaldehyde solution and 4 parts of potassium carbonate. After cooling, the resulting solution solidifies to a crystalline mass which, after drying, is a white crystalline powder having a melting point of 150° C.

50 parts of the dimethylol compound thus obtained are heated to boiling under a reflux condenser for about 4 hours with 100 parts of normal butanol and 2 parts of glacial acetic acid. The slightly viscous solution is neutralized with tertiary sodium phosphate and, after filtering off the salts and evaporation of the solvent and heating the residue for about ½ hour at 150° C., leaves behind highly lustrous colourless flexible films.

Example 8

100 parts of the acid amides of the mixture of poly-basic carboxylic acids, obtained by the oxidation of soya bean oil fatty acids with nitric acid, are heated with 100 parts of a 30 per cent aqueous formaldehyde solution and 3 parts of potassium carbonate until a clear solution is formed. The methylol compound precipitated from the solution by cooling is dried at from about 50° to about 70° C.

The methylol compound which melts at 116° C. is heated to about the melting temperature in an oil bath and about 0.5 per cent of benzene sulphonic acid is added. Immediate increase in the viscosity takes place and, after heating for some time, the mass coagulates to give a tough, solid elastic resin.

A mixture of 50 parts of the methylol compound with 100 parts of normal propyl alcohol and of 1 part of aqueous hydrochloric acid is evaporated. The residue forms a transparent, extremely flexible, elastic layer.

Example 9

60 parts of urea and 70 parts of adipic acid diamide (1 molecular proportion of urea and ½ molecular proportion of adipic acid diamide) are refluxed for 2 hours with 400 parts of a 30 per cent aqueous formaldehyde solution with an addition of 2 parts of aqueous hydrochloric acid. After evaporating the water, a soft elastic, transparent, colourless mass remains, which is soluble in ethyl alcohol giving a clear solution and which is converted into a flexible clear transparent resin by heating at 130° C. By varying the relative proportions of carboxylic acid amide and urea, it is possible to obtain harder or softer elastic products. The products are the softer the less urea is employed.

Example 10

350 parts of diglycollic acid diamide (melting point 180° C.) are intimately mixed with 300 parts of trioxymethylene and heated for half an hour while slowly raising the temperature. The mixture becomes rather mobile at 150° C., and after heating for half an hour at this temperature is gradually converted into a white, elastic resin.

If the condensation of the diglycollic acid diamide be carried out with aqueous formaldehyde and an addition of about 0.5 per cent of aqueous hydrochloric acid at 100° C., there is obtained, after neutralization of the acid and distilling off of the water, a colourless, transparent, soft water-soluble resin which may be converted into a harder state by heating at 130° C.

Example 11

250 parts of the diamide of orthophthalic acid, obtainable by acting with a concentrated aqueous solution of ammonia on ortho-phthalimide, are boiled under a reflux condenser together with 300 parts of a 30 per cent aqueous solution of formaldehyde, the mixture being previously incorporated with dilute aqueous hydrochloric acid until its hydrogen-ion concentration has a pH value of 3.0. After boiling for 1 hour a limpid, viscous solution is obtained which, after further short boiling, precipitates a very viscous colourless syrup. The syrup is separated from the supernatant aqueous liquid and heated to a temperature of about 150° C., a colourless, limpid, somewhat brittle resin being thus obtained, which is soluble in ethyl alcohol and the solutions of which yield hard films with a high gloss after evaporation of the solvent.

If the condensation is carried out in the presence of 5 parts of potassium carbonate, the syrup obtained solidifies to a white, not very hard mass which is also converted into a limpid, colourless and hard resin which is soluble in ethyl alcohol by heating to about 150° C. The conversion of the intermediate syrup into the resin may be accelerated by incorporating therewith small amounts of acid, such as hydrochloric acid, or of substances which, like ammonium chloride, yield acids on heating.

What we claim is:—

1. A resinous condensation product from a formaldehyde substance and the polyamides of the mixture of aliphatic poly-carboxylic acids obtained by oxidizing monobasic fatty acids containing at least 10 carbon atoms with nitric acid.

2. A resinous condensation product from a formaldehyde substance and the polyamides of the aliphatic polycarboxylic acids formed by oxidizing paraffin wax with nitric acid.

3. A resinous condensation product from a formaldehyde substance and the polyamides of the mixture of aliphatic polycarboxylic acids obtained by oxidizing fatty substances with nitric acid.

MICHAEL JAHRSTORFER.
HANS GEORG HUMMEL.